United States Patent [19]

Kitchin

[11] Patent Number: 4,573,888
[45] Date of Patent: Mar. 4, 1986

[54] FLUID PUMP

[75] Inventor: Dwight W. Kitchin, Littleton, Colo.

[73] Assignee: Aspen Laboratories, Inc., Englewood, Colo.

[21] Appl. No.: 720,115

[22] Filed: Apr. 4, 1985

Related U.S. Application Data

[63] Continuation of Ser. No. 530,838, Sep. 9, 1983, abandoned.

[51] Int. Cl.$^4$ .............................................. F04B 21/02
[52] U.S. Cl. .................................. 417/560; 417/566; 137/512.4; 137/855
[58] Field of Search ............... 417/560, 566, 380, 413; 137/512.4, 855, 856, 857, 858

[56] References Cited

U.S. PATENT DOCUMENTS

| | | | |
|---|---|---|---|
| 249,557 | 11/1881 | Truesdell | 137/855 |
| 727,069 | 5/1903 | Bomeisler | 417/566 |
| 2,725,183 | 11/1955 | Hanson | 137/856 |
| 3,058,140 | 10/1962 | Henss | 417/566 |
| 3,134,125 | 5/1964 | Kaiser | 417/413 |
| 3,568,712 | 3/1971 | Rinehart | 137/855 |
| 3,814,552 | 6/1974 | Guggenheim et al. | 417/413 |
| 4,181,477 | 1/1980 | Litt | 417/560 |

FOREIGN PATENT DOCUMENTS

| | | | |
|---|---|---|---|
| 1428007 | 12/1968 | Fed. Rep. of Germany | 417/566 |
| 1003011 | 9/1965 | United Kingdom | 137/855 |

Primary Examiner—Carlton R. Croyle
Assistant Examiner—Donald E. Stout
Attorney, Agent, or Firm—Paul David Schoenle

[57] ABSTRACT

This invention relates to an improved fluid pump. The pump is of the type, wherein a reciprocating motor acts in concert with supply and exhaust valves to pump fluid from a source to its destination. In the preferred embodiment, the motor comprises a reciprocating diaphragm and the supply and exhaust valves comprise a single resilient plate with individual valve members formed as cutouts therein. The valve plate is sandwiched between two plates which form the associated porting. The interaction between the various ports on the valve plates results in improved sealing effect for the valves.

5 Claims, 10 Drawing Figures

FLUID PUMP

This is a continuation of application Ser. No. 530,838, filed Sept. 9, 1983, now abandoned.

BACKGROUND OF THE INVENTION

This invention relates to improvements in motor operated pumps. The improved pump of the instant invention was specifically designed to be used as a component of a system for supplying fluid pressure to a system of tourniquets. In this environment it is quite important to be able to pump very low volumes of fluid to the tourniquets and to be able to pump quite low differential pressures. Prior art pumps known to applicant were not able to satisfy these criteria under very careful testing. The two pumps tested by applicant were a Romega 080 pump and a pump manufactured by K & F Neuberger.

Also known to applicant are the following U.S. Pat. Nos.:

3,058,140 to Henss shows a collapsible wall pump including as best shown in FIG. 4 a valve plate including two valve members 8 cut out therefrom. Depressing of collapsible wall 2 and successive expansion thereof causes a pumping of fluid from inlet direction a, to outlet direction b, through port 6.

3,134,125 to Kaiser discloses a pump which as best shown in FIG. 11 includes a valve plate 86 with valves 86a and 86b cut out therefrom. As best shown in FIG. 7, the pump, through the valve plate 86, controls flow from inlet 90 to outlet 92.

3,371,852 to Holt discloses a motor operated pump including as best shown in FIG. 7 valve plate 40 with valves 43 and 44 cut out therefrom. FIG. 5 shows the configuration of the valve plate 40 when mounted in its housing.

3,545,894 to Lovitz discloses a pump including as best shown in FIGS. 8 and 9 a single valve plate with two valves cut out therefrom. The valves control the supply and exhaust from a chamber in said pump.

4,181,477 to Litt shows as best seen in FIGS. 1 and 2 a diaphragm motor operated pump which includes a resilient valve plate 30 out of which slots 62 are cut to form valve members 60. The configuration of the valve plate 30 in the housing is best shown in FIG. 1 and includes opposed valve seats to control supply and exhaust of fluid to and from chamber 26.

Other patents known to applicant but considered less relevant than the above discussed patents are U.S. Pat. Nos. 1,619,481 to Oakes, 2,559,067 to Doeg, 2,638,849 to Budlane, 3,360,169 to Susuki, et al., 3,703,342 to O'Connor, 3,998,571 to Falke, and 4,099,544 to Itakura, et al.

SUMMARY OF THE INVENTION

The instant invention improves upon the earlier noted and discussed prior art by providing a simple motor operated pump which allows the pumping of low volumes of fluid at low differential pressures. With the use of the instant invention changes in pressure in a closed container of fractions of a millimeter of mercury of pressure are obtainable.

The invention includes a first head plate which includes inlet and outlet ports on one side and an inlet valve seat on the other side. The invention further includes a second plate which includes on one side a chamber closed by the motor operator and on the other side an outlet valve seat connected through a passage with the above noted chamber. Sandwiched between these two plates is a valve plate made of a resilient material and out of which are cut an inlet valve and an outlet valve. Various chambers are formed between the facing portions of the head plate and the second plate which chambers define flow passages for fluid and which chambers also are specifically designed in their configurations to interact to enhance the sealing effect of the valves against their respective seats.

It is a first object of the present invention to provide an improved pump operated by a motor.

It is a further object of the present invention to provide an improved motor operated pump which will pump very low volumes of fluid with high accuracy.

It is a still further object of the present invention to provide a motor operated pump with a capability of changing the pressure in an enclosure by a quite small increment.

It is a still further object of the present invention to provide a motor operated pump including chambers associated in such a fashion as to enhance the sealing capability of the particular valve which located in close relation thereto. These and other objects will become apparent in the following detail description when read in connection with accompanying drawings.

SPECIFIC DESCRIPTION OF THE PREFERRED EMBODIMENT

Figure 4:
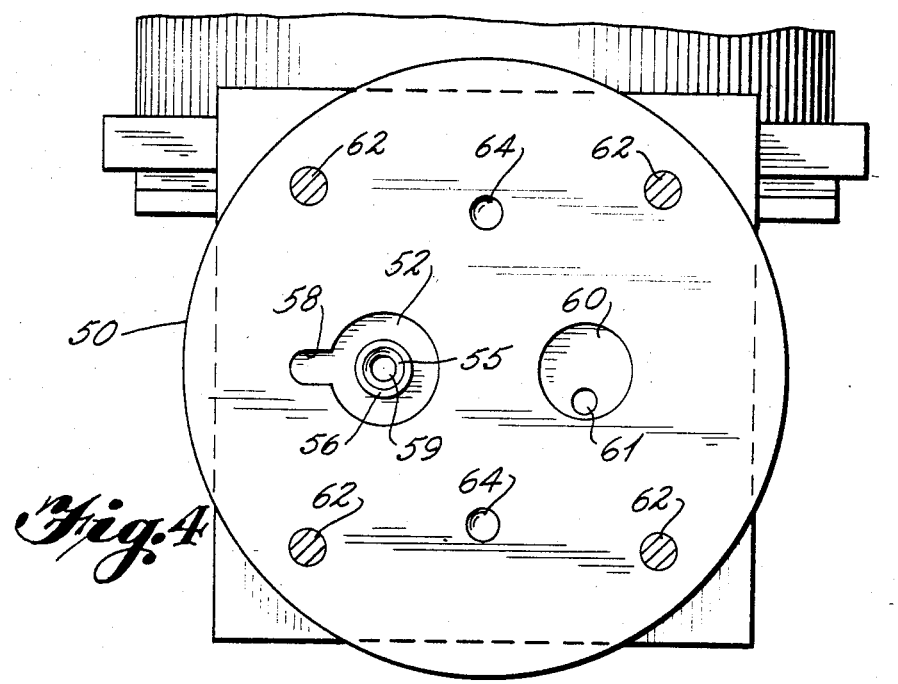
FIG. 4 shows a cross-sectional view looking downward along the line 4—4 of FIG. 2, showing the second plate.
Figure 5:
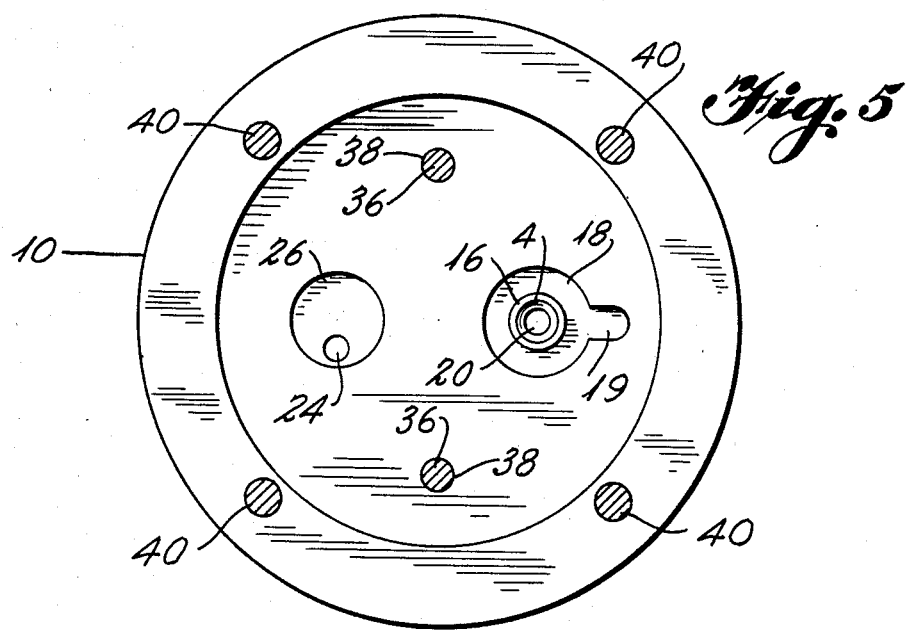
FIG. 5 shows a cross-sectional view looking upward along the line 5—5 of FIG. 2, showing the head plate.
Figure 8:
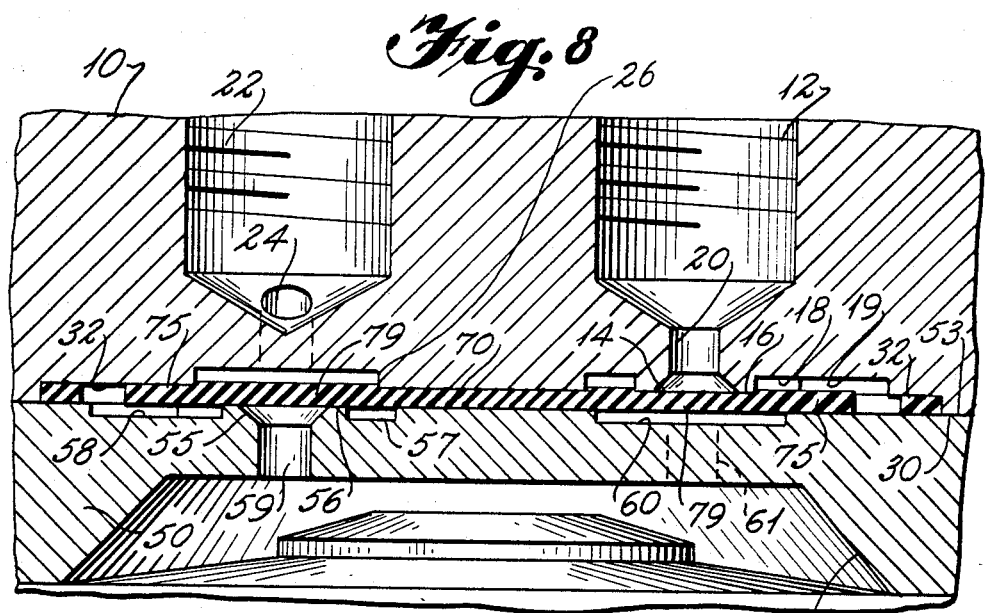
FIG. 8 shows an enlarged view of a portion of FIG. 3.
Figure 9:
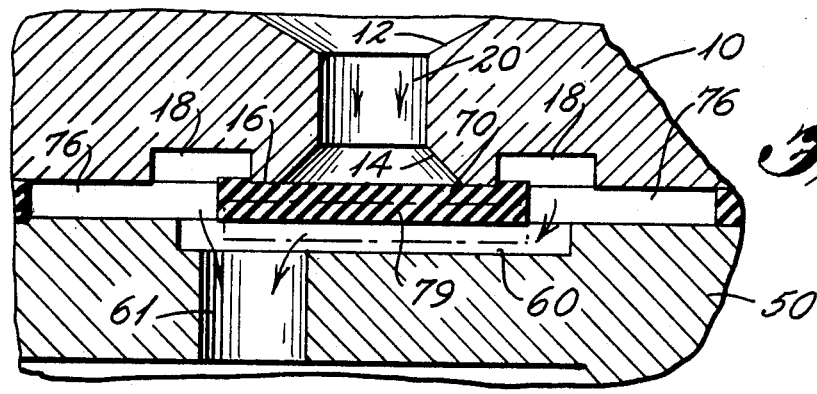
FIG. 9 shows a cross-sectional view along the line 9—9 of FIG. 1.
Figure 10:
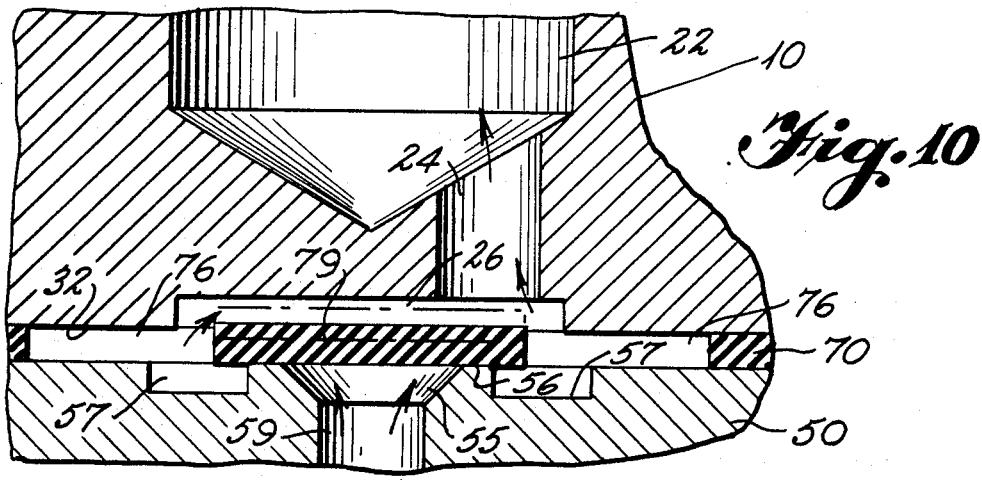
FIG. 10 shows a cross-sectional view along the line 10—10 of FIG. 1.

Referring now to FIGS. 3, 5 and 8-10, the head plate 10 will be described. Head plate 10 includes an inlet chamber 12, inlet port 14 and inlet valve seat 16. Formed in surrounding relation to valve seat 16 is a shallow chamber 18 best shown in FIG. 9. The main body of the chamber 18 is circular in shape but includes a protruding tongue portion 19 as best shown in FIGS. 5 and 8. Passageway 20 connects inlet chamber 12 with the chamber 18 through port 14. Head plate 10 also includes an outlet chamber 22 which connects through outlet passage 24 (best shown in FIG. 10) with further chamber 26. Further, the head plate includes a surface 30. Formed in stepped relation to the surface 30 is a further chamber 32 which is in flow communication with the chambers 18 and 26. Inlet chamber 12 and outlet chamber 22 are bored into surface 34 of the head plate 10 in the preferred embodiment. The chamber 32 is provided for a purpose to be described hereinafter. Pins 36 are provided on the head plate 10 and are press fit into bores 38. These pins 36 are provided for the purpose of aligning other elements to be described hereinafter which will be mounted on the head plate 10. Further provided on the head plate 10 are, in the preferred embodiment, four holes 40 each of which has a counter-sunk bore 42. These holes and counter-sunk bores are provided to enable rigid connection of the various pump elements together through the use of bolts (not shown in detail). Referring now to FIGS. 3, 4 and 8-10, a description of the intermediate second plate 50 will be made. The intermediate second plate 50 includes a first face 52 and a second face 53. Extending inwardly into the plate from the face 52 is a chamber 54. When the pump is assembled, a diaphragm 120 overlies the opening of the chamber 54 and it is the repeated reciprocation of the diaphragm which causes the pumping of fluid through the valve. Extending inwardly from the face 53 are port 55, valve seat 56 and chamber 57. As best shown in FIGS. 4 and 8, the chamber 57 includes a tongue-like portion 58 similar to the tongue-like portion 19 of the chamber 18. The chamber 57 is fluidly connected to the chamber 54 through port 55 and passageway 59. Also depending inwardly from face 53 is a chamber 60 which communicates with the chamber 54 through a passageway 61. As shown in FIG. 4, the intermediate second plate 50 also includes holes 62 which, in assembly, are aligned with the holes 40 in head plate 10 and holes 64 which, in assembly, slide over pins 36.

Figure 6:
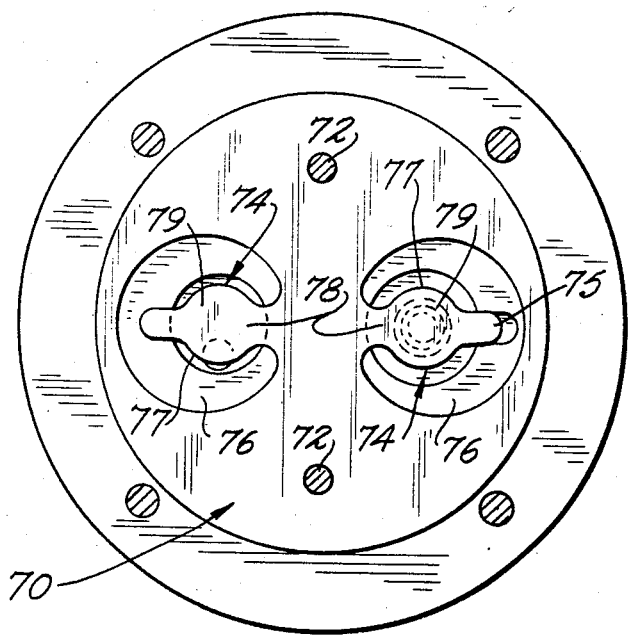
FIG. 6 shows a cross-sectional view looking upward along the line 6—6 of FIG. 2, showing the valve plate.
Figure 7:
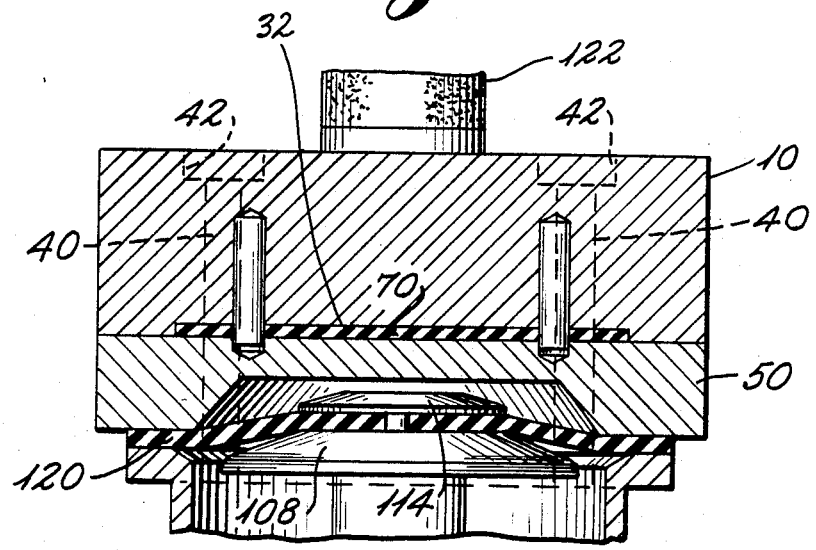
FIG. 7 shows a cross-sectional view along the line 7—7 of FIG. 1.

Referring now to FIG. 6, the valve plate 70, will be described. The valve plate 70 comprises a substantially circular entity made of a resilient elastomer material preferably silicon rubber. Holes 72, in assembly, fit over pins 36 in head plate 10. Valve heads 74 are formed in the valve plate 70 by cutting out from the valve plate 70 openings 76 which are defined at their outer boundaries by edges 77. Each of the valve heads 74 includes an isthmus portion 78 where the valve heads 74 are respectively connected to the body of the valve plate 70, a bulbous widened portion 79 and tongue-like extension 75.

Referring now to FIGS. 3 and 7-10, the relationship between the head plate, the valve plate and the intermediate second plate is seen in assembly. It is noted here that, in assembly, the valve plate 70 fits into the chamber 32 in the head plate 10. The thickness of the valve plate 70 is slightly greater than the depth of the chamber 32, therefore, when the intermediate second plate 50 is placed adjacent the head plate 10 with the valve plate 70 sandwiched therebetween, some compression of the elastomeric valve plate 70 occurs. With reference to the inlet side of the pump it is noted that the diameter of the chamber 18 in head plate 10 is greater than the diameter of the chamber 60 in the intermediate second plate 50 which chamber 60 is greater in diameter than the valve seat 16. This specific configuration causes the outer periphery of chamber 60 to lie within the outer periphery of the chamber 18, in assembly. This interaction between these outer peripheries compresses the isthmus portion 78 of the valve head 74 therebetween. This compression causes the bulging central portion 79 of the valve head 74 to bow outwardly away from the location of the seat 16 in the area of the isthmus 78 and this compression further causes the bulbous portion 79 in the area of the tongue-like extension 75 to blow inwardly back toward the direction of seat 16. The tongue-like extension 75 extends into portion 19 of the chamber 18. These ineractions: (1) between the thickness of valve plate 70 and the depth of chamber 32 and (2) between the respective diameters of the chambers 18 and 60, enhance the sealing effect of the valve head 74.

Similarly, looking at the outlet side of the pump, the diameter of chamber 57 in the intermediate second plate 50 is greater than the diameter of chamber 26 in the head plate 10 which, in turn, is greater than the diameter of the valve seat 56 in the intermediate second plate 50. Thus, in assembly, the outer periphery of the chamber 26 lies within the outer periphery of the chamber 57 which thereby compresses the isthmus 78 between the peripheries of chamber 26 and 57 causing the valve head 74 in the area of the isthmus 78 to bow away from valve seat 56 which further causes the area of the valve head 74 adjacent the tounge-like extension 75 extending into portion 58 of the chamber 57. Again these interactions: (1) the relationship between the thickness of the valve plate 70 and the depth of chamber 32, as well as (2) the relationship of the diameters of the chambers 57 and 26, enhances the sealing effect of the valve head 74.

In the preferred embodiment, the valve plate 70 is made approximately 0.031" thick. The diameter of chamber 18 and 57 is 0.375" in the preferred design whereas the diameter of the chambers 26 and 60 is made 0.312" in the preferred design. The valve seats 16 and 56 are made 0.157" in diameter. It is stressed that these dimensions are not to be considered to be limiting but are merely disclosed for the purposes of showing an example of a preferred embodiment. Applicant has experimented with the depth of the chamber 32 while keeping the thickness of the valve plate 70 at a constant thickness of 0.031". In these experiments, it has been found that by making the depth of the chamber 32 in the range of 0.018"-0.019" thick, almost no flow was observed traversing the valves with the pump operating at a maximum speed. Within the range 0.022"-0.024" thickness for the depth of the chamber 32, the pump was able to pump 2½ to 3 liters of fluid per minute. At a depth of 0.024", 4 liters per minute of flow was observed. As the depth of the chamber 32 was increased in the direction of 0.030", to wit, approaching the thickness of the valve plate 70, the flow rates achieved increased considerably but at the same time the advantages of the invention, namely (1) the ability to pump very low flow rates accurately, and (2) the ability to change differential pressures accurately, were reduced as was the ability of the valves at low flow rates to seal in the reverse direction of flow thereof.

With the dimensions set as preferred, namely, with the depth of the chamber 32 set at between 0.022"-0.024" the pump is operable from speeds as high as 2,000 rpm to speeds as low as fractions of an rpm with the accuracy of flow maintained and leakage in the reverse direction of flow nonexistent. The pump in this configuration shows an ability to change the pressure in a confined container such as a tourniquet by a difference of a few millimeters of mercury of pressure by operating the pump at speeds of less than 1 rpm. The term rpm in this specification refers to a single revolution of the motor shown in FIGS. 1-3 which, through the associated linkage, causes one upward and one downward movement of the diaphragm 120 best shown in FIGS. 3 and 7. The flow rate at a given pump speed may be further adjusted through adjustment of the depth in the direction of flow of the respective chambers 26 and 60. It is further noted that the difference in width between the width of the tongue-like extension 75 of the valve head 74 on the one hand and the width of the respective chamber portions 19 and 58 has some bearing on the enhancement of the sealing effect of the valve heads 74. In the preferred embodiment, again, not to be considered in any way limiting, the tongue-like extensions 75 have a width of 0.1" whereas the width of the chambers 19 and 58 is set at 0.125". This difference in widths between the width of the chambers and that of the tongue-like extensions constitutes approximately 0.025" which allows the tongue-like extensions 75 to bow downwardly in the direction of their respective seats to thus enhance the sealing effect of the valve heads 74.

Figure 1:
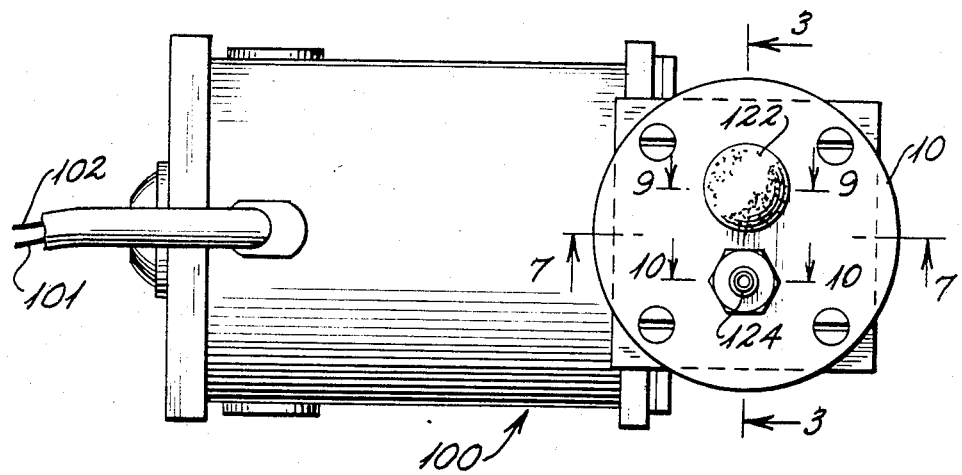
FIG. 1 shows a top view of the invention.
Figure 2:
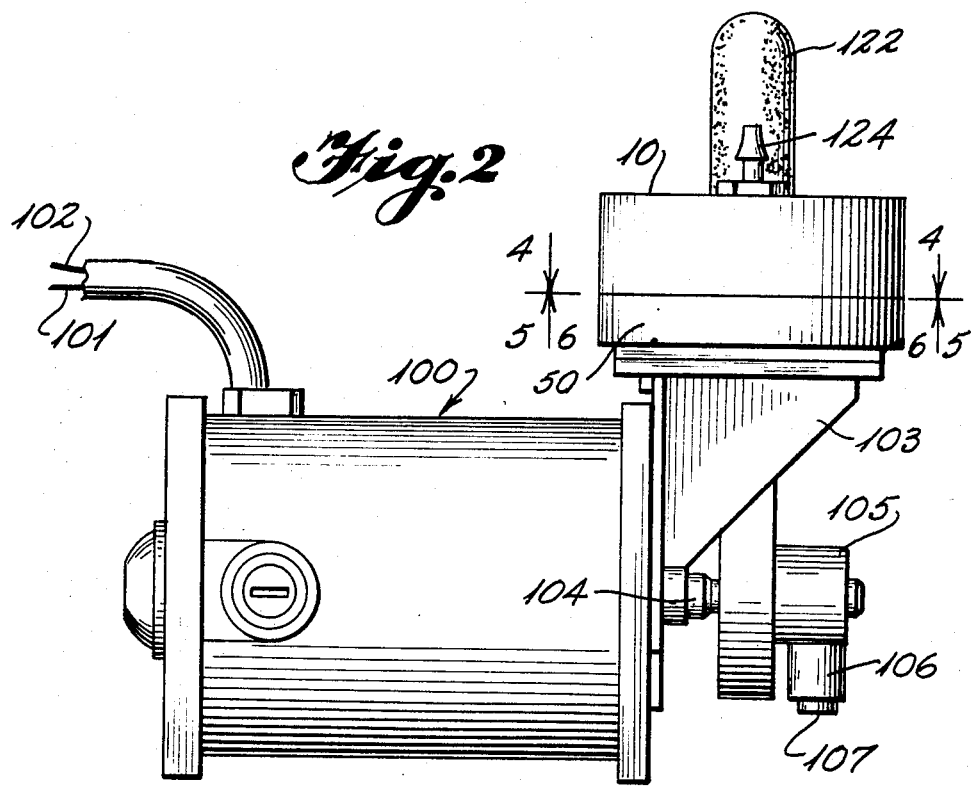
FIG. 2 shows a side view of the invention.
Figure 3:
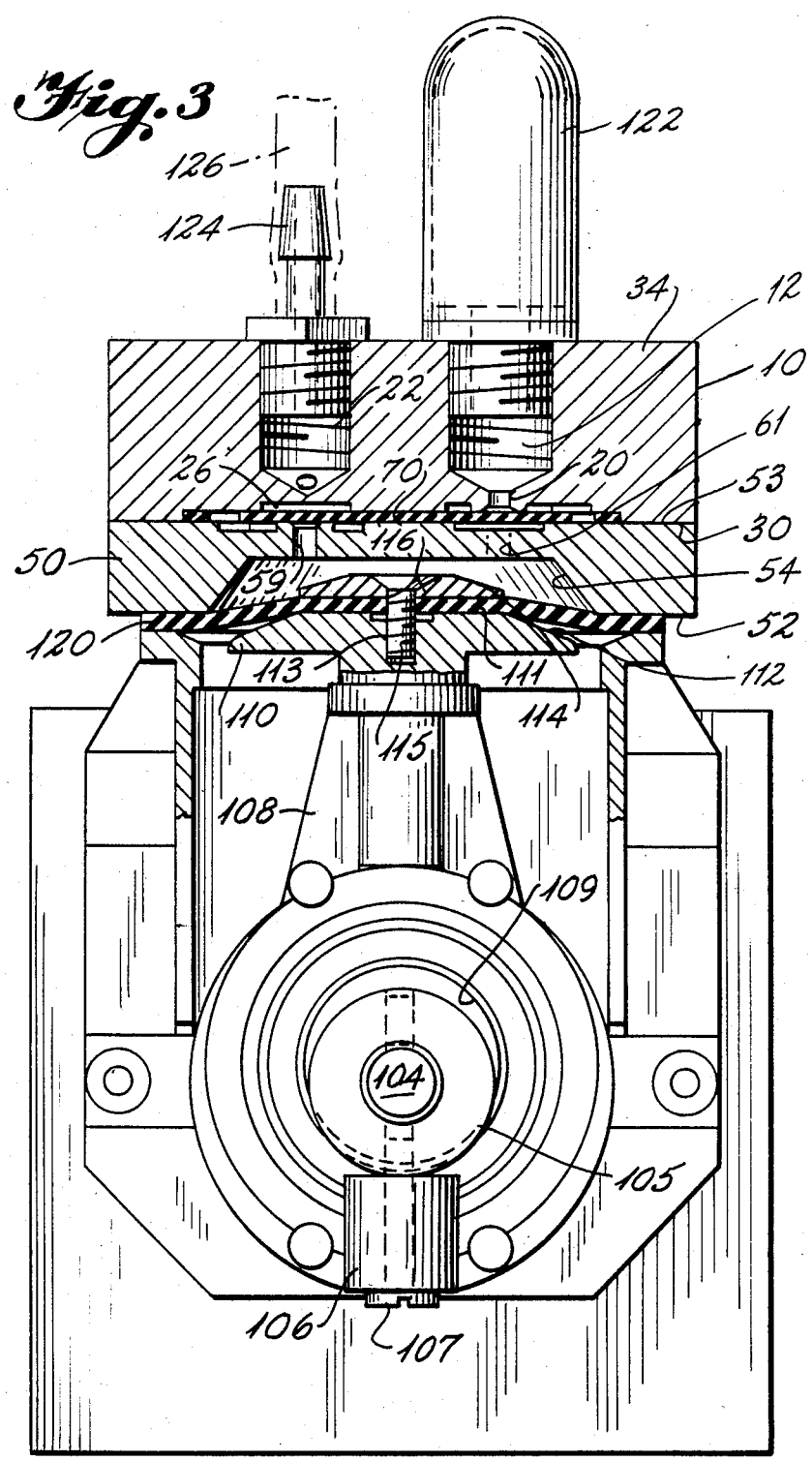
FIG. 3 shows a cross-sectional view along the line 3—3 of FIG. 1.

Referring now to FIGS. 1-3, a description of the motor and associated linkage will be made. As best shown in FIGS. 1 and 2, the motor 100 is connected through wires 101, 102 to a source (not shown) of direct current power. The pump, including plates 10 and 50 is securely mounted to the motor 100 through structure including bracket 103. The motor has a drive shaft 104 which rotates to perform work. In the preferred embodiment, an eccentric 105 is attached to the drive shaft by way of counterweight 106 and bolt 107. A connecting rod 108 is provided with an orifice 109 at one end thereof through which extends the eccentric 105. At the other end of rod 108, a plate 110 is formed which includes a flat surface 111, an annular sloped surface 112 and a threaded opening 113. The diaphragm 120 is sandwiched between plate 110 and another plate 114 and retained therebetween by a bolt 115 threaded through hole 116 in plate 110. In operation, rotation of the shaft 104 is converted to reciprocatory motion of rod 108 through the interaction between the rod 108, opening 109 and the eccentric 105 to thereby move the diaphragm 120 toward and away from the ports 59 and 61 to thereby pump fluid from inlet 12 to outlet 22. As further shown in FIGS. 1-3, inlet 12 may, if desired, have integrally connected thereto a filter element 122 for filtering air being pumped through the invention. Further, if desired, the outlet 22 may have connected thereto coupling fitting 124 for coupling to an outlet tube 126 to convey the pumped fluid to its ultimate destination.

In the preferred embodiment, the motor 100 used to reciprocate the diaphragm 120 consists of a 0.05 horsepower 12 volt DC intermittent duty motor.

As such, it is seen that applicant has disclosed improvements in a pump which quite drastically improve the accurate control ability of the pressurization of a closed chamber such as that which is found in a tourniquet.

While applicant has disclosed one embodiment of the present invention, it is to be understood that this embodiment is given by example only and is not to be considered to be limiting in any way, the scope of the present invention being determined solely by the breadth of the following claims.

I claim:
1. An improved fluid pump with a check valve cooperating with a reciprocating diaphragm comprising:
   (a) an inlet upstream of the check valve;
   (b) an outlet downstream of the check valve;
   (c) a valve seat between said inlet and outlet;
   (d) a resilient valve member movably mounted between said inlet and outlet and cooperating with said valve seat to allow flow above a predetermined pressure from said inlet to said outlet while preventing flow in a reverse direction;
   (e) a first chamber disposed on one side of said resilient valve member and substantially surrounding said valve seat and a second chamber disposed on the other side of said resilient valve member and surrounding said outlet;
   (f) the diameter of said first chamber being slightly greater than the diameter of said second chamber and the diameter of said second chamber being slightly greater than the diameter of said valve seat;
   (g) said valve member being formed as a portion of a valve plate, said valve member including an isthmus connected to a main portion of said valve plate, and said isthmus is wedged between an outer peripheral portion of said first chamber and an outer peripheral portion of said second chamber; and
   (h) said first chamber further includes a tongue-like extension extending outwardly from said outer peripheral portion thereof, said valve member includes a tongue-like extension which extends into said tongue-like extension of said first chamber in spaced relation to said main portion of said valve plate and said valve member tongue-like extension remaining in engagement with the outer peripheral portion of said second chamber at all times even when said main portion is moved relative to said valve seat.

2. An improved fluid pump comprising a diaphragm reciprocal axially relative to a first plate to form a variable volume chamber, the first plate cooperating with a second plate to substantially define an intermediate chamber therebetween, the plates including a pair of first passages cooperating with each other to provide for fluid communication to the variable volume chamber via the intermediate chamber and a pair of second passages cooperating with each other to provide for fluid communication away from the variable volume chamber via the intermediate chamber, a resilient valve member disposed in the intermediate chamber to control communication through the pair of first and second passages in response to movement of the diaphragm, the plates cooperating with each other independently of the resilient valve member to control the depth of the intermediate chamber when the plates are secured together, the depth of the resilient valve member being greater than the depth of the intermediate chamber so that the resilient member is compressed when disposed in the intermediate chamber, one of the plates defining a seat engageable with the resilient valve member and the other plate defining an auxiliary chamber in alignment with the seat, the resilient valve member being deformable at the location of the seat to move away therefrom and into the auxiliary chamber when the diaphragm is reciprocating, the seat cooperating with the resilient valve member when in engagement therewith to bow the latter outwardly away from that portion of the resilient valve member compressed between the plates and slightly into the auxiliary chamber so that the resilient characteristics of the resilient valve member urge the latter into sealing engagement with the seat, the resilient valve member defining a cutout forming a widened portion coupled to the remaining portion of the resilient valve member via an isthmus, the widened portion engaging the seat when the one passage is closed and the widened portion includes a tongue-like extension disposed in the intermediate chamber, the other plate cooperating with the tongue-like extension to prevent movement of the latter in the direction of movement for the widened portion when the latter moves in response to reciprocation of the diaphragm.

3. The improved fluid pump of claim 2 in which the diameter of the auxiliary chamber is larger than a diameter formed by the widened portion of the resilient valve member so that the widened portion is free to move axially into the auxiliary chamber even though the tongue-like extension is prevented by the other plate from movement in the same direction.

4. The improved fluid pump of claim 2 in which the intermediate chamber includes an enlarged portion receiving the tongue-like extension so that the latter is free to move in a normal direction relative to the axial direction.

5. An improved fluid pump comprising a diaphragm reciprocal axially relative to a first plate to form a variable volume chamber, the first plate cooperating with a second plate to substantially define an intermediate chamber, the plates including a pair of first passages cooperating with each other to provide for fluid communication to the variable volume chamber and a pair of second passages cooperating with each other to provide for fluid communication away from the variable volume chamber, a resilient valve member disposed in the intermediate chamber to control communication through the pair of first and second passages in response to movement of the diaphragm, one of the plates defining a seat engageable with the resilient valve member to sealingly engage the latter, the resilient valve member being movable away from the seat in response to movement of the diaphragm, the resilient valve member defining a tongue-like extension and a seat-engaging portion, the seat-engaging portion being coupled to the remainder of said resilient valve member and carrying said tongue-like extension in spaced relation to said remainder of said resilient valve member, said tongue-like extension being engageable with the other plate to prevent movement of said tongue-like extension in the direction of movement for said seat-engaging portion and to direct movement thereof in a normal direction to said axial direction whereby said tongue-like extension is freely movable in said normal direction when said seat-engaging portion is moved away from said seat and said tongue-like extension cooperates with the other plate to yieldably retain said seat engaging portion adjacent said seat when said diaphragm is at rest.

* * * * *